A. G. BAKER & F. W. KNOTT.
TYPE SETTING MACHINE.
APPLICATION FILED AUG. 20, 1910. RENEWED JUNE 21, 1915.

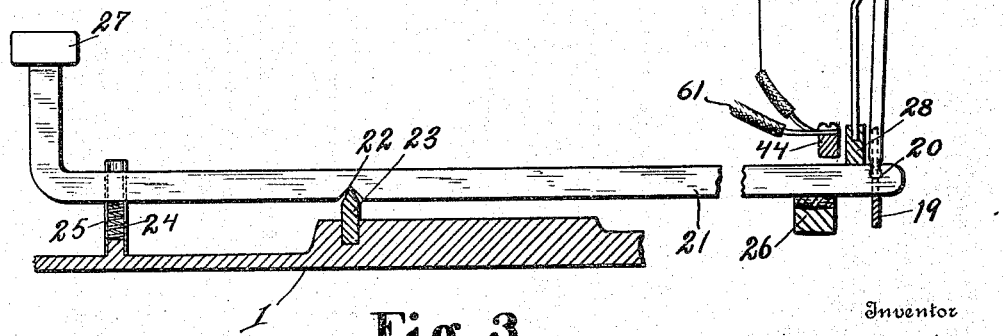

1,169,111.

Patented Jan. 25, 1916.
7 SHEETS—SHEET 7.

UNITED STATES PATENT OFFICE.

ARTHUR G. BAKER AND FRANK W. KNOTT, OF DETROIT, MICHIGAN, ASSIGNORS TO THE UNIVERSAL MACHINE COMPANY, OF DETROIT, MICHIGAN.

TYPE-SETTING MACHINE.

1,169,111.  Specification of Letters Patent.  Patented Jan. 25, 1916.

Application filed August 20, 1910, Serial No. 578,080. Renewed June 21, 1915. Serial No. 35,428.

*To all whom it may concern:*

Be it known that we, ARTHUR G. BAKER and FRANK W. KNOTT, citizens of the United States, residing at Detroit, Michigan, have invented certain new and useful Improvements in Type-Setting Machines, of which the following is a specification.

This invention relates to improvements in typesetting machines, and particularly to improvements in typesetting machines in which electrical devices and means are largely available.

The objects of the invention are: First, to improve the key action of such a machine. Second, to improve the type ejectors for such a machine. Third, to provide improved electrical connections and means for operating the parts of a typesetting machine. Fourth, to provide improved setting-up means for the type in such a typesetting machine. Fifth, to provide improved means to support the type when set up in line. Sixth, to provide an improved galley support for such a machine. Seventh, to provide improved feed mechanisms for the galley for such a machine. Eighth, to provide an improved space-indicator to show the spaces needed for full justification of each line as it is set-up in such a machine.

Further objects, and objects relating to structural details, will definitely appear from the detailed description to follow.

We accomplish the objects of our invention by the devices and means described in the following specification.

The invention is clearly defined and pointed out in the claims.

Figure 1:
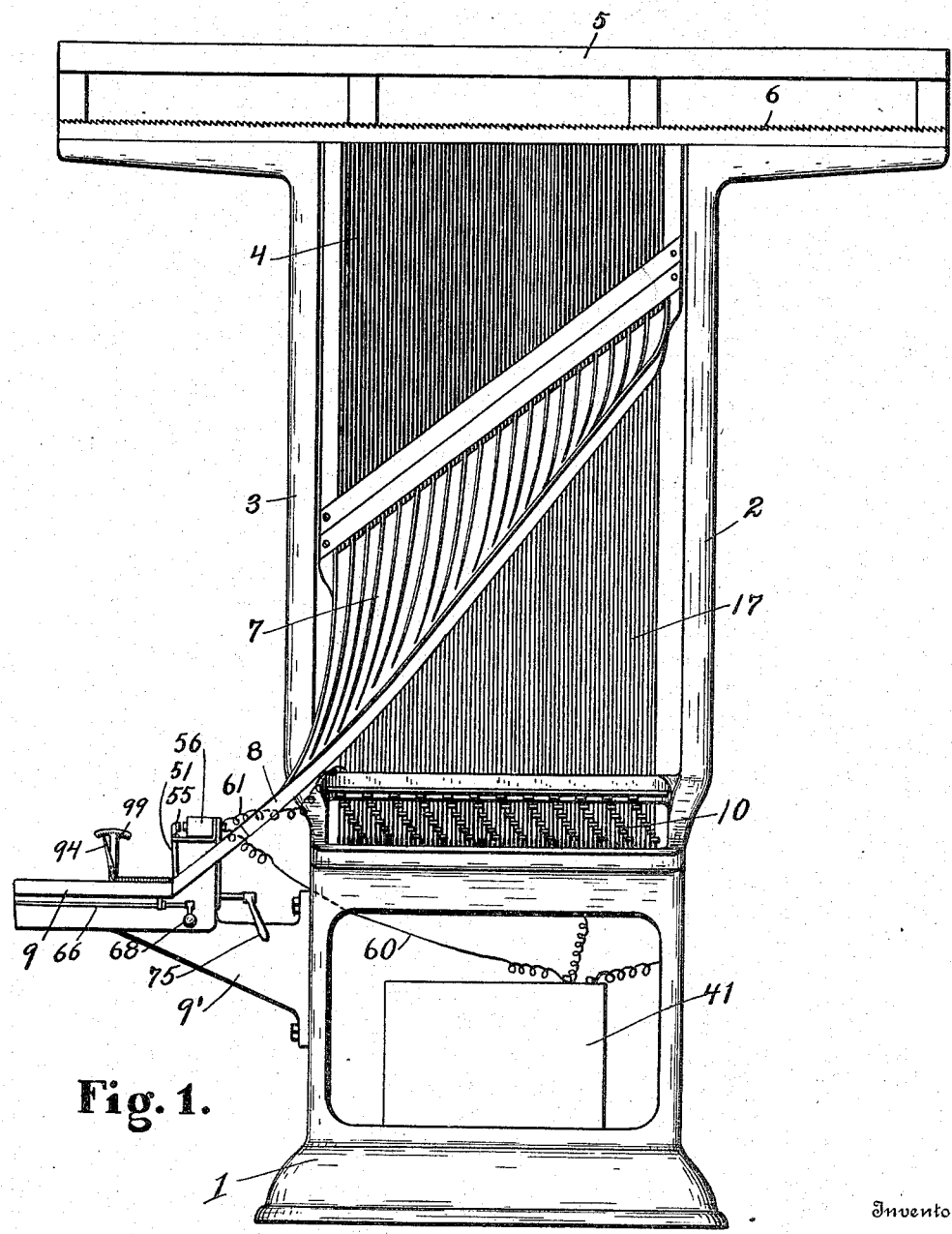
Figure 2:
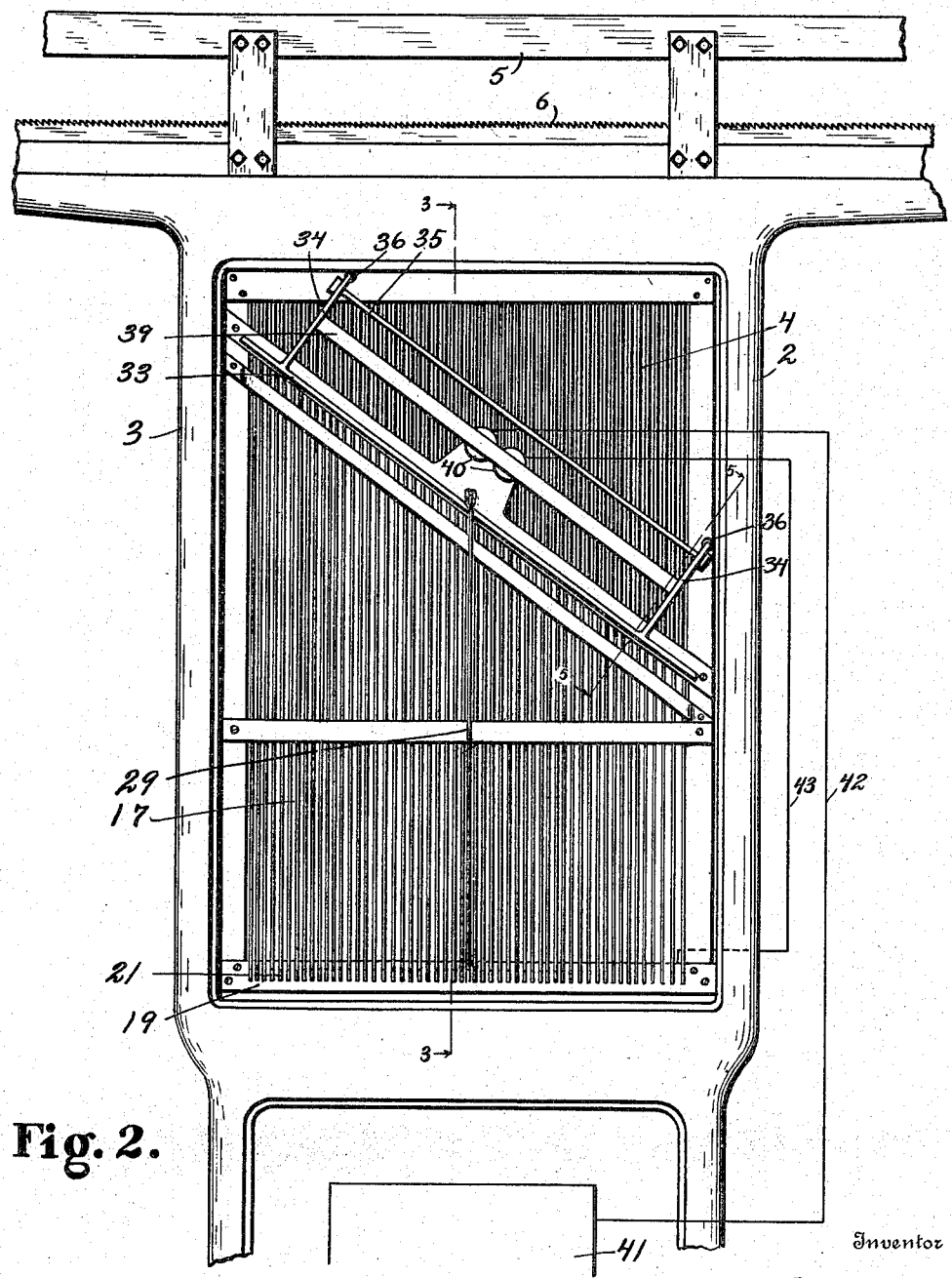
Figure 6:
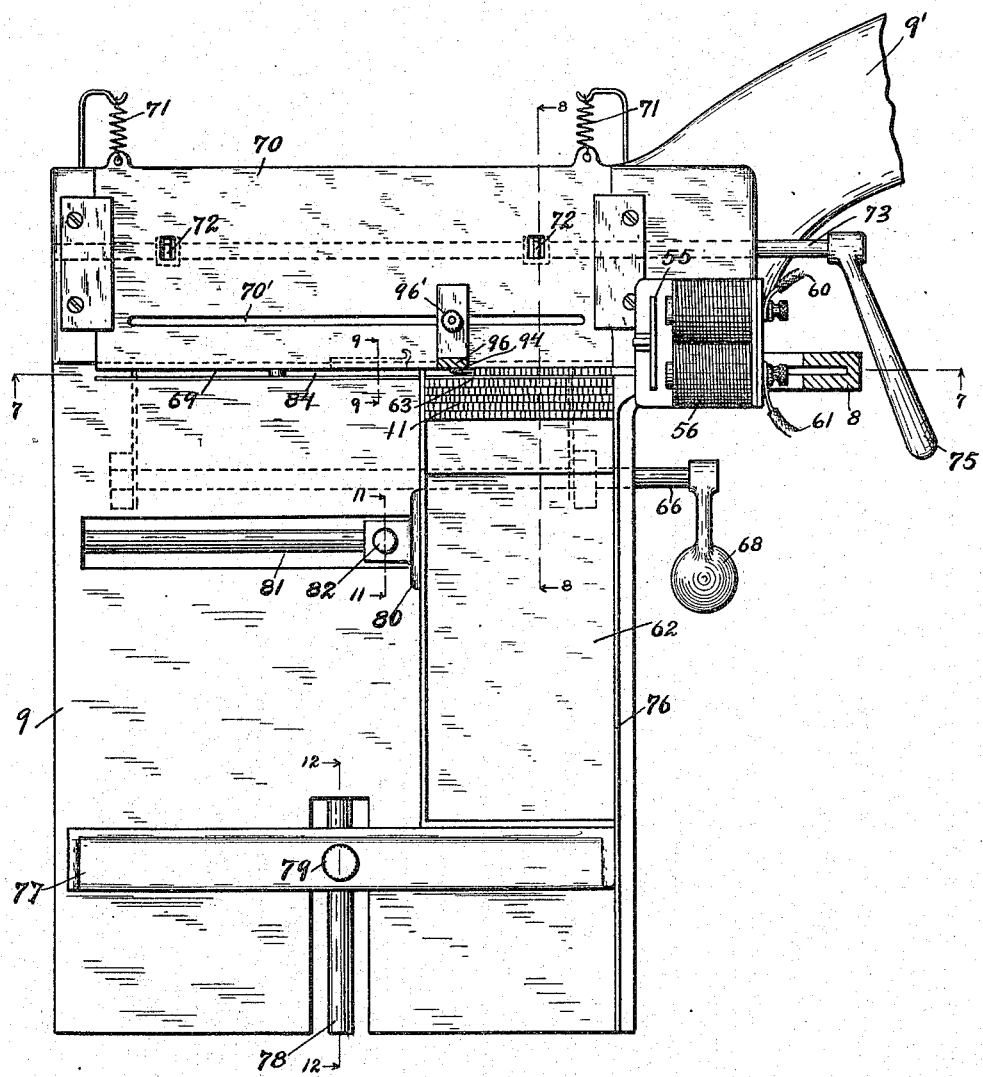
Figures 7, 13, 14:
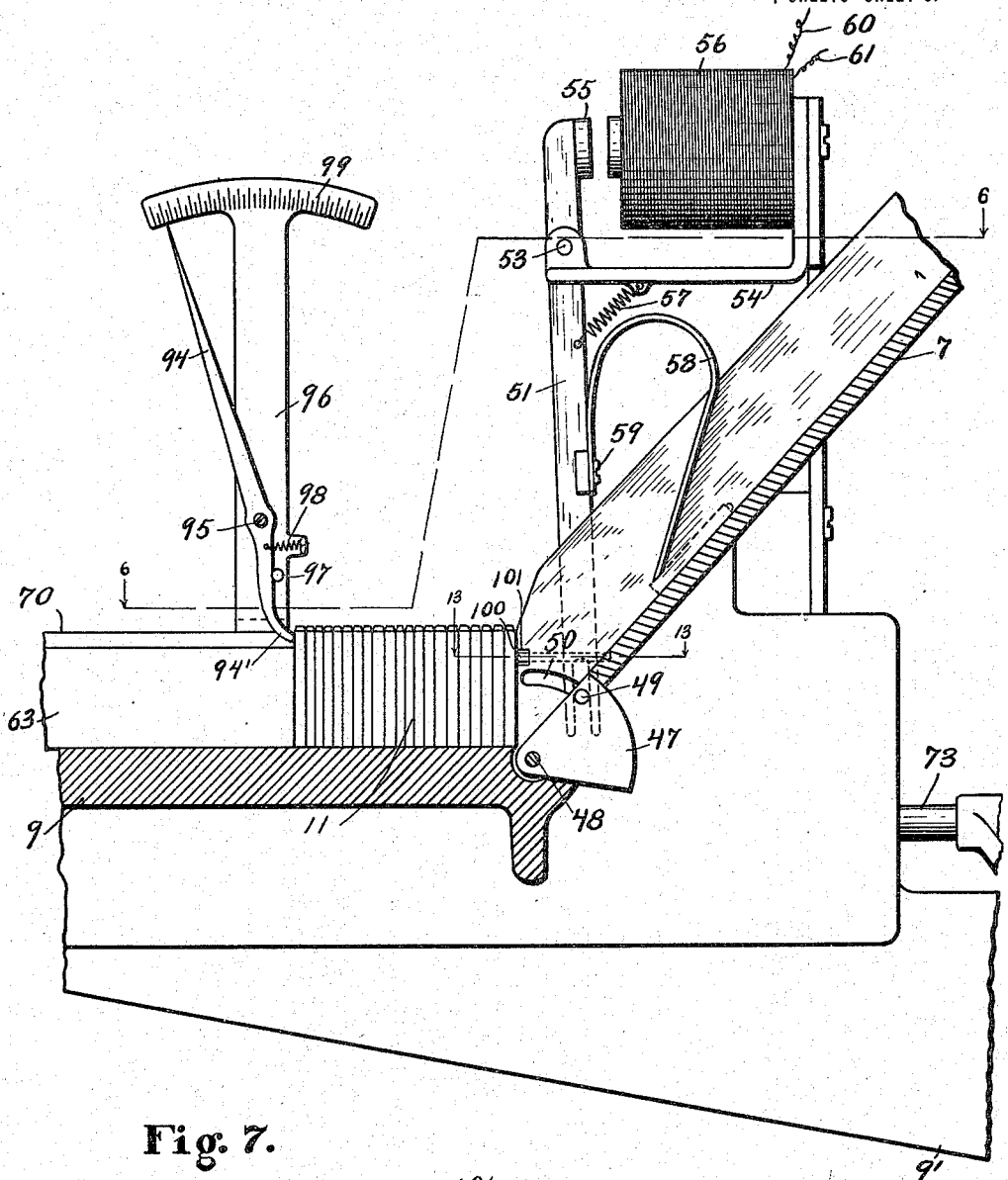
Figure 8:
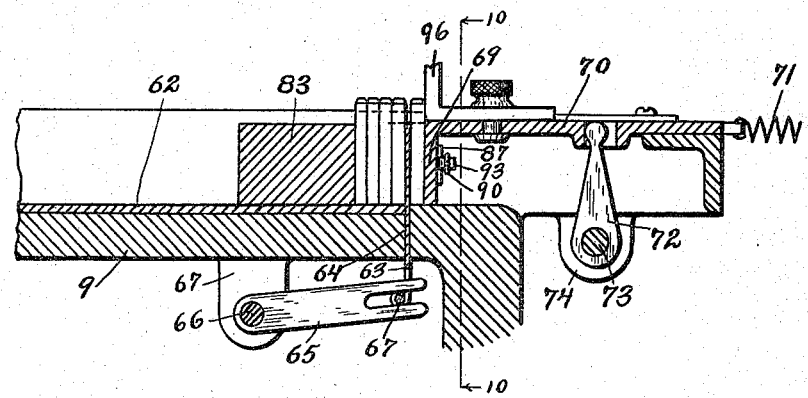
Figure 9:
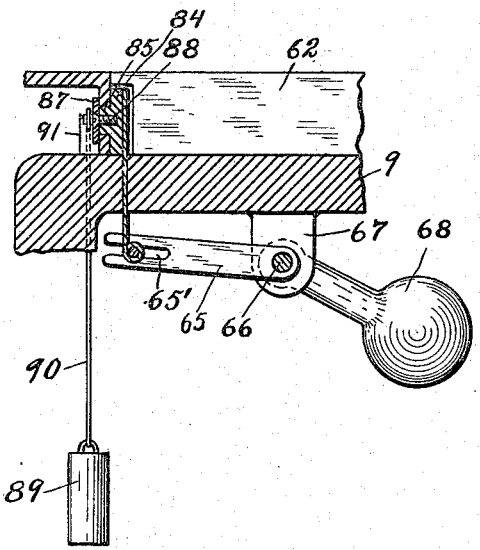
Figures 11, 12:
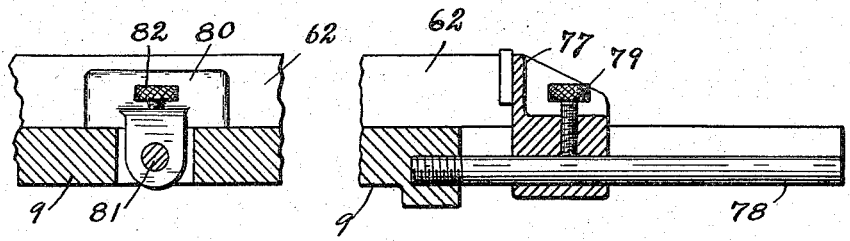
Figure 10:
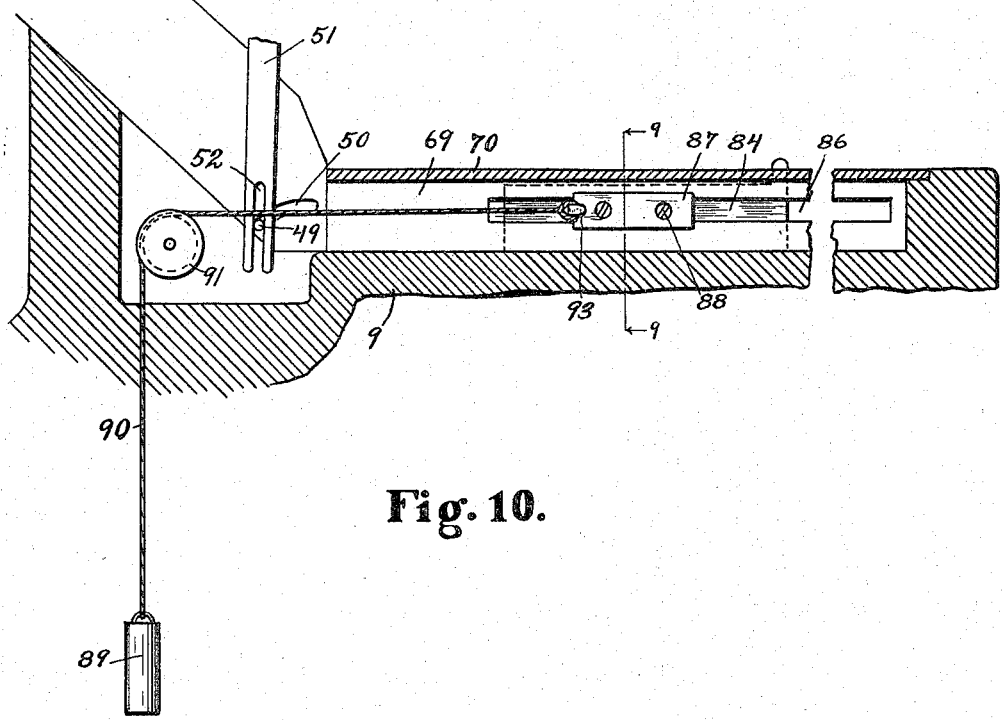

A structure which is a preferred embodiment of our invention is clearly illustrated in the accompanying drawing, forming a part of this specification, in which:

Figure 1 is a front elevation view of our improved typesetting machine, with the type distributer omitted. Fig. 2 is a rear elevation of the upper portion of the machine, the setting-up devices being omitted. Fig. 3 is a detail vertical sectional elevation, in broken section, taken on a line corresponding to lines 3—3 of Figs. 1 and 2. Fig. 4 is a detail horizontal sectional view on line 4—4 of Fig. 3, showing details of the plungers for ejecting the type and adjacent coöperating parts. Fig. 5 is an enlarged detail sectional view, through a portion of the type ejector means, taken on a line corresponding to line 5—5 of Fig. 2. Fig. 6 is an enlarged detail plan view, partially in section, on the irregular line 6—6 of Fig. 7, of the galley support and the type setting-up means, the electromagnet 56 appearing in full lines, although above said section line. Fig. 7 is an enlarged detail sectional elevation, taken on a line corresponding to line 7—7 of Fig. 6, through the type setting-up mechanism, showing the space indicator. Fig. 8 is a similar transverse detail sectional view on line 8—8 of Fig. 6, through the galley support and parts. Fig. 9 is an enlarged detail sectional elevation view, illustrating parts of the galley support and line controlling means, taken on a line corresponding to lines 9—9 of Figs. 6 and 10. Fig. 10 is an enlarged detail sectional view, taken on a line corresponding to line 10—10 of Fig. 8, showing details of construction of the setting-up means. Fig. 11 is a detail sectional view on line 11—11 of Fig. 6, showing details of the clamp means for the galley. Fig. 12 is an enlarged detail sectional view on line 12—12 of Fig. 6, showing other adjusting head supporting means for such galley. Fig. 13 is a detail sectional plan view on line 13—13 of Fig. 7, showing details of the type support. Fig. 14 is a detail perspective view of the type support spring 100.

In the drawing, the sectional views are taken looking in the direction of the little arrows at the ends of the section lines, and similar numerals of reference refer to similar parts throughout the several views.

Considering the numerals of reference, the base 1 of the machine is of the usual construction and is provided with upright side supports 2 and 3, between which are arranged the channels 4 of the typesetting machine, which are in the usual form.

Across the top of the machine is a rail 5, on which the distributer carriage is preferably disposed, the same being actuated by suitable ratchet means on the ratchet acting on the toothed bar 6. As the distributer means which we employ is made the subject-matter of an independent application of concurrent date, we do not specifically describe the same herein, but will remark that a variety of distributer devices might be used in connection with the features we have here illustrated and devised.

The type apron 7 with the front guide 8 is of the form of that appearing in the application of Arthur G. Baker, filed December 30, 1907, Serial No. 408,543. The bottom ends 40 of the channels 4 are in an inclined line for the reason indicated in the aforesaid patent application.

The type galley support 9 is on the bracket 9' down at the left side in proper position to support the galley and receive the type from the apron 7 and the guide 8. A keyboard 10 is arranged below and in front of the said apron 7. The type 11 are stored in the channel 4 and supplied thereto by any suitable distributer above mentioned. A plunger 12 is at the bottom of each channel, suitably guided in a hole in the back of the case at that point. The plungers are held in their normal position by a spring 13, which engages through the plunger by a suitable hook 14. The springs 13 are supported by an offset portion 16 projecting into a perforation in an oblique transverse supporting rib 15 at the rear of the machine,—see Figs. 2 and 3.

A vertical plunger bar 17, corresponding to each plunger 12, is arranged back of the same for actuation in a manner that will be hereafter described. These plungers are arranged in a comb 18 arranged at the back of the machine, which guides the same, and the lower ends of the plunger bars are guided between the teeth of the comb 19 in the lower rear part of the machine,—see Figs. 2 and 3. The lower end of each plunger bar 17 is fitted loosely into a dovetailed slot 20 in the top of the rear end of a key lever 21. The key levers 21 are all notched at 22 and rest upon a transverse fulcrum bar 23, and are suitably guided in slotted tubular posts 24 toward their front ends and rest upon springs 25 in the lower part of said posts. The front of each key lever is provided with a key-button 27. It will thus be seen that, whenever a key is acted upon by depressing its button 27, the key lever will rock upon the fulcrum 23 and throw the bar 17 upwardly. This brings the upper end of the bar in position to be acted upon by the electrical means hereafter to be described.

A common bar 28 extends across the rear ends of the key levers 21 and is acted upon whenever any key is depressed. A push rod 29 is secured to the central part of this common bar 28 and extends upwardly to release a catch to permit the operation of the type ejector device. This catch consists of a lever 30, pivoted at 31 at the rear of the machine, and provided with a tooth or shoulder 32, which engages the obliquely-transverse bar 33, which is supported at the rear of the machine.

The bar 33 is provided with parallel transverse arms 34 at or near its opposite ends, which arms 34 are pivoted on the rod 35, which is suitably supported at the back of the main frame. An elongated armature 39 connects these arms together. Each arm 34 is extended beyond the rod 35, which constitutes a fulcrum therefor, and a spring 36 is connected to a suitable eye 37 in the extended end of said arm, and the opposite end of said spring 36 is connected to a suitable eye 38 in the frame of the machine;—for details, see Fig. 5. An elongated armature 39 connects these arms 34 and is in position to be acted upon by the electromagnet 40,—see Figs. 2 and 3. This electromagnet is in the circuit 42, 43, which is connected to the battery 41, preferably arranged in the base of the machine,—see Figs. 1 and 2.

An insulated bar 44 is arranged transversely and above the rear ends of the keys 21. This bar 44 is in the circuits of the different magnets in the machine and is insulated from the remainder of the machine to which the opposite pole of the circuit is connected, so that, whenever a key of the machine is depressed and brought into contact with the bar 44, the different circuits in the machine are closed and the electromagnets are all operated. So, it will be seen that, whenever a key 27 is depressed, the rear end of the key is brought into contact with the transverse bar 44 and the circuit is closed, and the magnet 40 will act upon the armature 39 and throw the transverse bar 33 against the upper end of any bar 17, which may be raised into position. This quick action of the magnet will swing this common bar against the bar 17, which, in turn, acts on the plunger and ejects the type. Each type 11, when ejected, will strike the transverse bar 46 and drop down between the teeth 45 of the guiding comb, disposed in that position, onto the apron 7, and then on down to the guide 8 to the setting-up device. A plate 46', preferably transparent, is above the apron, at such height as to prevent the type from turning.

The setting-up device consists of a segmental piece 47, pivoted at 48, and playing up into the guide 8 for the type, and raising them to the vertical position, as clearly indicated in Fig. 7. This setting-up segment 47 is provided with an actuating pin 49, which plays in the curved slot 50 in the side of the guide 8. The pin 49 is engaged by the slot 52 in the end of the lever 51. This lever 51 is fulcrumed at 53 on the bracket 54 and carries an armature 55 at its upper end in position to be acted upon by the electromagnet 56. This lever 51 is held in its normal position by a spring 57, connecting the longer arm thereof to the bracket 54. A retaining spring 58, recurved upon itself and extended down into proximity to the type in the type guide 8, is secured to the lever 51 by the rivets 59. The magnet 56 is actuated from the circuit 60—61, the branch 60 being connected to the frame of the machine, and the branch 61 being connected to the insulated transverse contact bar 44 in the lower rear part of the machine already described and referred to. On the side wall of the guide 8 is a spring 100, the free end 100' of which is oblique and arranged through aperture 101 in said wall and acts like a yielding pawl to engage any type that is set up and retain it in position. The spring 100 yields readily. It will, therefore, be seen that, whenever a key is depressed, the circuit of the magnet will be closed and a type 11 will be set up into the galley and an additional type will be allowed to descend to the setting-up device.

The galley support is provided with a vertical plate 64, arranged in a slot therethrough, having a downwardly-projecting portion 63 through which is arranged a horizontal wire 67, which is embraced by a slot 65' in the rock shaft arms 65, which are secured to the rock shaft 66. The rock shaft 66 is journaled in downwardly-projecting ears 67 on the under side of the galley support 9. A weighted handle 68 is provided on the rock shaft 66, which urges the plate 64 normally upward. It will be observed that the type are set up adjacent to this plate 64, and, when a line is completed, the plate 64 is depressed down through the bottom of the galley support 9, and the type moved along by appropriate devices into the galley 62. These devices consist of the opposed vertical plates 69, which project downwardly from the forward edge of the transverse plate 70. This transverse plate 70 is suitably guided and held normally in position to oppose the said plate 64 by the spring 71, which will draw the same to the right point to form a type channel for the line of type between the said vertical part 69 and the thin plate 64. Vertical rock shaft arms 72 engage the under side of this plate 70 in suitable slots formed therefor, and are carried by the rock shaft 73 in downwardly-depending ears 74 on the sides of the said galley frame support 9. A handle 75 is provided on this rock shaft for manipulating the same to force a line into the galley after it has been completely set up. The side 76 of the galley support is thick. The top support of the galley 77 is adjustable and is held in place on the rod 78 by means of the set-screw 79 therethrough,—see Figs. 6 and 12.

A clamp support 80 of the galley is adjustable on the rod 81 by means of the set-screw 82 and is opposed to the heavy side 76. A metal block 83 is provided in the galley which slides along the same, and serves to support the type in position as they are advanced by the actuation of the line-moving device. A movable type supporting slide 84 is provided for the type as they are set up in line in the machine. This is provided with a guiding slide 85, which is movable in the slot 86, which is in the front support 69 for the type,—see Figs. 6, 9 and 10. The plate is retained in the guide by the flange plate 87, which is secured thereto by a suitable screw 88. A weight 89 is connected by a cord 90 arranged over the guiding pulley 91,—see Fig. 10,—to an eye 93 on the plate 87. This supports the type constantly under tension against the setting-up device, and avoids any slack between the type. On the plate 70 is an upwardly-projecting standard 96, having a segmental scale 99 at the upper end thereof. A pointer 94 is pivoted on this standard 96 at 95, the lower end of which has a finger 94' extending down into the path of the line of type. This finger is held in normal position by the spring 98, urging the same against a stop pin 97. It will thus be seen that, when the type are fed into the galley, and after a certain quantity of the type has been set up, it eventually comes in contact with the finger 94'. This occurs always at the same point, so that, after the contact, whenever type are filled in, the pointer 94 indicates on the scale 99 exactly the number of spaces that will be needed to fill the line. An operator, when setting up type, on approaching the end of a line, will thus be able to know exactly how many spaces to add to the line to make it a full line. This will enable the operator, or an assistant, to justify the line and properly distribute the spaces, as the required number will be set up along with the rest of the type at the end of the line. This space indicator is made adjustable by a set-screw 96' in a slot 70' in the plate 70, so that it can be set at any predetermined point, depending on the width of the galley which is being made use of.

We have now described completely all parts of our machine, and we will proceed to indicate completely the operation of the same. After a proper quantity of the type has been distributed and stored in the channels 4, an operator can depress any key 27, or any number of keys successively, which may be required to fill out or set up the type desired. As he depresses each key, the rear end of the key will be raised upwardly. This will first lift the plunger bar 17 up into position to be engaged by the oblique transverse common actuating bar 33. As the motion continues, the push bar 29 will raise the catch 30 and permit this bar to be actuated, so that, on the continued motion of the key 27, it will contact with the electrical contact bar 44 and close the circuit. This will cause the electromagnet 40 to act, draw the armature 39 inwardly, which will cause the transverse bar 33 to strike the upper end of the elevated bar 17 and force the plunger 12 against the bottom type in the particular corresponding channel. The type will then pass out between the teeth 45 of the comb 46 and drop down upon the apron 7 and slide down into the guide 8, and down the inclined portion to the setting-up device. At this point, it will come in contact with the spring 58, and be guided down to the setting-up segment 47. On the next depression of a key, this operation will be repeated, and the type that has first dropped down to the setting-up device will be acted upon by the setting-up device by means of the lever 51 when the circuit is again closed, because that will cause the electromagnet 56 to act upon the armature 55, which will set the type up in line, as indicated in Figs. 6 and 7. When a line of type has thus been set up, or substantially set up, the operator notices the position of the pointer 94 and fills in the necessary number of spaces to make his line complete. The operator then takes hold of the weighted lever 68 and pulls the same upwardly, which depresses the plate 64, and he then depresses the hand lever 75, which carries the line into the galley against the supporting block 83. As additional lines are set up, this operation is repeated until the galley is full. An operator then removes the galley 62 from the machine and completely justifies by inserting the spaces properly between the words in the line.

Having thus described our invention, what we claim as new and desire to secure by Letters Patent is:—

1. In a typesetting machine, the combination of a machine with suitable base and frame with type channels arranged and supported therein; an apron for the type in front of the said channels with a suitable guide for the type at the front thereof; a type ejector plunger at the bottom of each channel; a corresponding spring for returning each of said plungers to initial position; a key-board made up of key levers for the machine; vertical bars, corresponding to said plungers, suitably guided at the back of said machine in position to be raised into operative relation therewith; a key lever corresponding to each of said bars and pivotally connected at its rear end to its corresponding vertical bar; a transverse plunger-actuating bar disposed to the rear of the machine, supported on suitable pivoted arms; an armature operatively associated with said actuating bar; an electromagnet for actuating the said plunger actuating bar; a catch for the said actuating bar for holding it in the initial inoperative position; a universal bar above the keys of the key-board with a connection to said catch for releasing the same on the actuation of any key; a transverse universal contact bar connected and in open electric circuit with said electromagnet, the same being arranged to close the circuit whenever any key is actuated; a type setting-up means arranged to coöperate with the said type guide consisting of a setting-up segment arranged in the said type guide; means for actuating the said setting-up segment, consisting of a pin on the said segment; a slotted lever for actuating the same; an armature on the said lever; an electromagnet arranged to act upon the said armature, the circuit of which is connected to the aforesaid circuit closing bar in the rear of the said machine, whereby, when any key is depressed, said setting-up means will be actuated; a galley support for the type set up by said machine; a line support for the type to be delivered to the galley, consisting of a vertical depressible plate through a slot in the said support; and a line moving plate suitably guided to force the line of type into the galley, when the line-supporting plate is depressed, all coacting substantially as described and for the purpose specified.

2. In a typesetting machine, the combination of a machine with suitable base and frame with type channels arranged and supported therein; an apron for the type in front of the said channels with a suitable guide for the type at the front thereof, a type ejector plunger at the bottom of each channel; a corresponding spring for returning each of said plungers to initial position; a key-board made up of key levers for the machine; vertical bars, corresponding to said plungers, suitably guided at the back of said machine in position to be raised into operative relation therewith; a key lever corresponding to each of said bars and pivotally connected at its rear end to its corresponding vertical bar; a transverse plunger-actuating bar disposed to the rear of the machine, supported on suitable pivoted arms; an armature operatively associated with said actuating bar; an electromagnet for actuating the said plunger actuating bar; a catch for the said actuating bar for holding it in the initial inoperative position; a universal bar above the keys of the key-board with a connection to said catch for releasing the same on the actuation of any key; a transverse universal contact bar connected and in open electric circuit with said electromagnet, the same being arranged to close the circuit whenever any key is actuated; a type setting-up means arranged to coöperate with the said type guide consisting of a setting-up segment arranged in the said type guide; means for actuating the said setting-up segment, consisting of a pin on the said segment; a slotted lever for actuating the same; an armature on the said lever; an electromagnet arranged to act upon the said armature, the circuit of which is connected to the aforesaid circuit closing bar in the rear of the said machine, whereby, when any key is depressed, said setting-up means will be actuated, and a galley support for the type set up by said machine, all coacting substantially as described and for the purpose specified.

3. In a typesetting machine, the combination of a machine with suitable base and frame with type channels arranged and supported therein; an apron for the type in front of the said channels with a suitable guide for the type at the front thereof; a type ejector plunger at the bottom of each channel; a corresponding spring for returning each of said plungers to initial position; a key-board made up of key levers for the machine; vertical bars, corresponding to said plungers, suitably guided at the back of said machine in position to be raised into operative relation therewith, a key lever corresponding to each of said bars and pivotally connected at its rear end to its corresponding vertical bar; a transverse plunger-actuating bar disposed to the rear of the machine, supported on suitable pivoted arms; an armature operatively associated with said actuating bar; an electromagnet for actuating the said plunger actuating bar; a catch for the said actuating bar for holding it in the initial inoperative position; a universal bar above the keys of the key-board with a connection to said catch for releasing the same on the actuation of any key; a transverse universal bar connected and in open electric circuit with said electromagnet, the same being arranged to close the circuit whenever any key is actuated; a type setting-up means arranged to coöperate with the said type guide; and a galley support for the type set up by said machine, all coacting substantially as described and for the purpose specified.

4. In a typesetting machine, the combination of a machine with suitable base and frame with type channels arranged and supported therein; an apron for the type in front of the said channels with a suitable guide for the type at the front thereof; a type ejector plunger at the bottom of each channel; a corresponding spring for returning each of said plungers to initial position; a key-board made up of key levers for the machine; vertical bars, corresponding to said plungers, suitably guided at the back of said machine in position to be raised into operative relation therewith; a key lever corresponding to each of said bars and pivotally connected at its rear end to its corresponding vertical bar; a transverse plunger-actuating bar disposed to the rear of the machine, supported on suitable pivoted arms; an armature operatively associated with said actuating bar; an electromagnet for actuating the said plunger actuating bar; a catch for the said actuating bar for holding it in the initial inoperative position; a universal bar above the keys of the key-board with a connection to said catch for releasing the same on the actuation of any key; a transverse universal contact bar connected and in open electric circuit with said electromagnet, the same being arranged to close the circuit whenever any key is actuated; a type setting-up means arranged to coöperate with the said type guide; a galley support for the type set up by said machine; a line support for the type to be delivered to the galley, consisting of a vertical depressible plate through a slot in the said support; and a line moving plate suitably guided to force the line of type into the galley, when the line-supporting plate is depressed, all coacting substantially as described and for the purpose specified.

5. In a typesetting machine, the combination of a machine with suitable base and frame with type channels arranged and supported therein; an apron for the type in front of the said channels with a suitable guide for the type at the front thereof; a type ejector plunger at the bottom of each channel; a corresponding spring for returning each of said plungers to initial position; a key-board made up of key levers for the machine; vertical bars, corresponding to said plungers, suitably guided at the back of said machine in position to be raised into operative relation therewith; a key lever corresponding to each of said bars and pivotally connected at its rear end to its corresponding vertical bar; a transverse plunger-actuating bar disposed to the rear of the machine, supported on suitable pivoted arms; an armature operatively associated with said actuating bar; an electromagnet for actuating the said plunger actuating bar; a transverse universal contact bar connected and in open electric circuit with said electromagnet, the same being arranged to close the circuit whenever any key is actuated; a type setting-up means arranged to coöperate with the said type guide; and a galley support for the type set up by said machine, all coacting substantially as described and for the purpose specified.

6. In a typesetting machine, the combination of a machine with suitable base and frame with type channels arranged and supported therein; an apron for the type in front of the said channels with a suitable guide for the type at the front thereof; a type ejector plunger at the bottom of each channel; a corresponding spring for returning each of said plungers to initial position; a key-board made up of key levers for the machine; vertical bars, corresponding to said plungers, suitably guided at the back of said machine in position to be raised into operative relation therewith; a key lever corresponding to each of said bars and pivotally connected at its rear end to its corresponding vertical bar; a transverse plunger-actuating bar disposed to the rear of the machine, supported on suitable pivoted arms; an armature operatively associated with said actuating arm; an electromagnet for actuating the said plunger actuating bar; a contact means in open electric circuit with said electromagnet arranged to close the circuit whenever a key is actuated; a type setting-up means arranged to coöperate with the said type guide; and a galley support for the type set up by said machine, all coacting substantially as described and for the purpose specified.

7. In a typesetting machine, the combination of a machine with suitable base and frame with type channels arranged and disposed therein; an apron for receiving the said type with a suitable guide for the type at the front thereof; type ejectors for ejecting the type from said channels as required; keys in a key-board for actuating the same; a type setting-up means arranged to coöperate with the said type guide, consisting of a setting-up segment arranged in the said type guide; means for actuating the said setting-up segment, consisting of a pin on the said segment; a slotted lever for actuating the same; an armature on the said lever; an electromagnet arranged to act upon the said armature; a circuit closing bar in the rear of the machine in an open electric circuit with said magnet, arranged to coöperate with the keys of the machine, the said keys of the key-board being arranged to act upon the said circuit closing bar whenever any key is actuated; and a galley support for the type set up by the said machine, all coacting substantially as described and for the purpose specified.

8. In a typesetting machine, the combination of a machine with suitable base and frame with type channels arranged and disposed therein; an apron for receiving the said type with a suitable guide for the type at the front thereof; type ejectors for ejecting the type from said channels as required; keys in a key-board for actuating the same; a type setting-up means arranged to coöperate with the said type guide, consisting of a setting-up segment arranged in the said type guide; an electromagnet and armature connected to operate said segment; a circuit closing bar in the rear of the machine in an open electric circuit with said magnet, arranged to coöperate with the keys of the machine, the said keys of the key-board being arranged to act upon the said circuit closing bar whenever any key is actuated; and a galley support for the type set up by the said machine, all coacting substantially as described and for the purpose specified.

9. In a typesetting machine, the combination of a machine with suitable base and frame, with type channels supported therein; an apron and guide for the type in front of said channels; a type ejector plunger for each of said channels; an actuator bar for said plungers; an electromagnet connected to swing said actuator bar; a set of key levers with means for operatively connecting each plunger to said bar; a type setting-up means coöperative with the type guide; an electromagnet and connection therefor to the said type setting-up device; and a circuit closing means in the circuits of said magnets arranged to coöperate with said keys and be closed on the actuation of any key coacting for the purpose specified.

10. In a typesetting machine, the combination with the frame of the machine having suitable type channels with key lever ing means and connections for ejecting the type; an apron with a type guide for receiving the said type; a type setting-up device cooperate with said type guide and having a suitable actuating pin thereon; a bifurcated lever engaging the said pin; an electromagnet connected to actuate said lever for oscillating the said segment; a recurved spring secured to the said lever and extending into the type guide for engaging the type in the guide when the magnet is operated; and a circuit closing device connected with the key levers of the machine to be operated whenever a key lever is depressed, coacting for the purpose specified.

In witness whereof, we have hereunto set our hands and seals in the presence of two witnesses.

ARTHUR G. BAKER. [L. S.]
FRANK W. KNOTT. [L. S.]

Witnesses:
WM. A. SNYDER,
W. LE ROY ESGAR.

Copies of this patent may be obtained for five cents each, by addressing the "Commissioner of Patents, Washington, D. C."